A. WARTH.

Cloth-Cutting Machines.

No. 130,344.

Patented Aug. 6, 1872.

Witnesses.
Ernst Bilhuber.
Chas. Wahlers.

Inventor.
Albin Warth
per
Van Santvoord & Hauff
Attys

UNITED STATES PATENT OFFICE.

ALBIN WARTH, OF STAPLETON, NEW YORK.

IMPROVEMENT IN CLOTH-CUTTING MACHINES.

Specification forming part of Letters Patent No. 130,344, dated August 6, 1872.

*To all whom it may concern:*

Be it known that I, ALBIN WARTH, of Stapleton, in the county of Richmond and State of New York, have invented a new and Improved Machine for Cutting Textile and other materials; and I do hereby declare the following to be a full, clear, and exact description thereof, which will enable those skilled in the art to make and use the same, reference being had to the accompanying drawing forming part of this specification, in which drawing—

Figure 1:
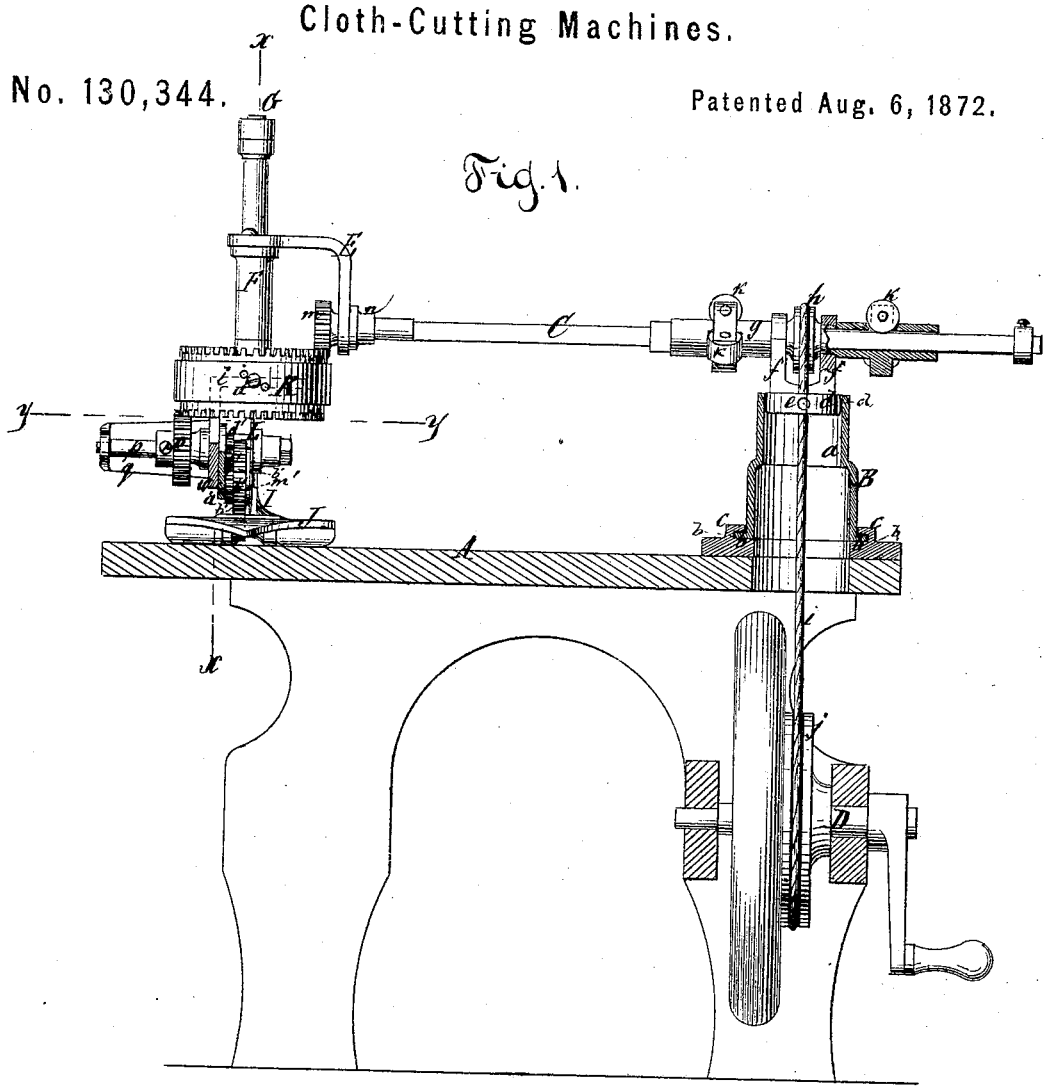
Figure 2:
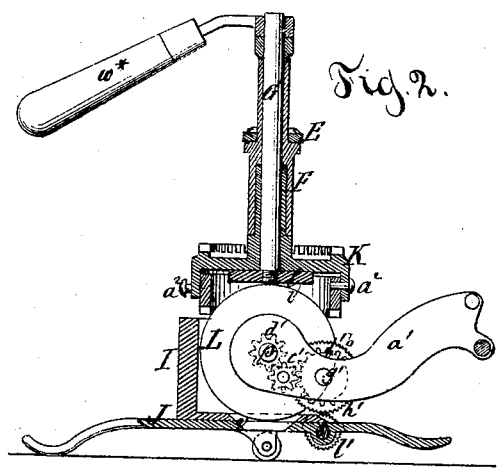
Figure 3:
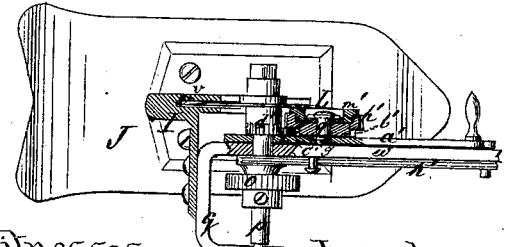

Figure 1 represents a sectional side view of this invention. Fig. 2 is a vertical section of the cutting mechanism in the plane $x\,x$, Fig. 1. Fig. 3 is a horizontal section of the same in the plane $y\,y$, Fig. 1.

Similar letters indicate corresponding parts.

This invention consists in the combination of a rotating knife with a throat-plate containing a knife-receiving socket, and with a sliding and revolving shaft, in such a manner that by the sliding and revolving shaft a rotary motion is imparted to the knife, and at the same time the knife and throat-plate follow the sliding motion of said shaft; and, besides this, those parts have an independent rotating motion round an axis at right angles to the sliding and rotating shaft. Further, in combining, with the throat-plate, the rotating knife, and the sliding and revolving shaft, a standard, which carries a handle and rises from the throat-plate and forms the bearings for the spindle of the knife, while its upper portion is round and fitted into two sleeves, one inside the other, the first sleeve carrying a double cog-wheel that serves to transmit the rotary motion from the sliding and revolving shaft to the rotating knife, while the second sleeve forms the support for one end of the sliding and revolving shaft in such a manner that the throat-plate, together with the rotating knife, can be turned round in either direction without being thrown out of gear with the sliding and revolving shaft, while at the same time the sliding motions of said shaft are transmitted to the cutting mechanism; also, in the arrangement of a sectional double cog-wheel in combination with the throat-plate, the rotating knife, and the sliding and revolving shaft, in such a manner that said cog-wheel can be readily adjusted to knives of different diameters, and that when the knife wears off and has to be moved close to the throat-plate the double cog-wheel can be adjusted accordingly; further, in combining, with the rotating knife, the throat-plate, and the sliding and rotating shaft, an automatic feed-receiving motion from the spindle of the rotating knife, in such a manner that the material to be cut can be fed automatically toward the rotating knife, or that the rotating knife, together with the throat-plate, can be fed toward the material to be cut; also, in the arrangement of a sharpening-stone or other sharpening device in the side of or connected to the feed-wheel, said sharpening-stone being made to act on the side of the rotating knife in such a manner that, as said knife revolves, its cutting-edge is continually kept sharp, and at the same time, by the motion of the feed-wheel a constantly-varying surface of the sharpening-stone is presented to the knife.

In the drawing, the letter A designates a table, from which rises the swivel-head B, which supports the sliding and revolving shaft C. Said swivel-head consists of a tubular standard, $a$, which is provided with a bottom flange, $b$, to fit into a grooved bracket, $c$, which is firmly secured to the table A, the tubular standard being free to rotate in said bracket. In the mouth of the tubular standard is fitted a plate, $d$, which swings between center-points $e$, and from which rise two standards, $f$, that form the bearing for a tubular shaft, $g$. By means of the center-points $e$ this shaft can be swung up or down, or brought in any desired inclination toward the table A, while the tubular standard $a$ allows the same to turn freely in either direction in a plane parallel to the surface of the table. On the tubular shaft $g$ is mounted a pulley, $h$, which connects by a belt, $i$, with a pulley, $j$, mounted on the driving-shaft D, that has its bearings in boxes secured to one of the legs of the table A, and which receives motion by a hand-crank, or by a treadle, or by any other suitable means. The pulleys $h$ and $j$ are grooved, so that when the standard $a$ is turned around the belt $i$ will not be thrown off. The tubular shaft $g$ is bored out to receive the sliding shaft C, which is, by preference, made triangular, but which may be formed in any desirable manner, so that it will not turn in the tubular shaft, while it is free to slide therein. The sliding motion of the shaft C is facilitated by friction-rollers $k$, which project through the sides of the tubular shaft $g$, and bear from different sides against the sliding shaft C. One end of said sliding shaft is turned off round, and it has its bearings in a bracket, E, which extends from a sleeve, F, fitted on the cylindrical rod G. This rod is supported by a standard, I, which rises from the throat-plate J, said standard being provided with a flange, $l$, shown in Fig. 2 and in Fig. 1 in dotted lines, that is provided with a hole to receive the rod G. On the flange $l$ rests a double cog-wheel, K, which is dropped loosely on the rod G beneath the sleeve F, said sleeve being bored out to receive the tubular hub of the cog-wheel. Said cog-wheel is provided with teeth on its upper and also on its lower surface, and it is made in two sections which fit into each other like telescope tubes, so that, by drawing the inner section out, the distance between the upper and the lower set of cogs can be increased, and vice versa. The two sections of the cog-wheel K are secured in the required position by set-screws $a^2$. The upper cogs of said cog-wheel gear into a pinion, $m$, mounted on the end of the sliding shaft C inside of the bracket E, said shaft being prevented from sliding by the pinion on one and by a screw-ring, $n$, on the other side of said bracket. The lower set of cogs of the cog-wheel K gears into a pinion, $o$, which is mounted on a shaft, $p$, that has its bearings in a bracket, $q$, extending from or forming a part of the standard I of the throat-plate. On this shaft is also secured the circular disk-knife L, and, as the sliding-shaft C is revolved a rotary motion is imparted to the disk-knife. The cutting-edge of the knife co-operates with a cutting-edge formed on the side of the throat $v$ in the throat-plate J. From the bracket $q$, which supports the shaft $p$, extends an arm, $w$, which may serve as the handle for guiding the mechanism during the operation of cutting; or, if desired, an additional handle, $w^*$, may be secured to the upper end of the rod G. (See Fig. 2.) On one side of the arm $w$ is placed a lever, $a^1$, which has its fulcrum on the shaft or spindle $p$, and in which is secured a pin, $g$, that forms the bearing for the feed-wheel $h'$. On the inside of this feed-wheel is fastened a cog-wheel, $b'$, which is geared by an intermediate pinion, $c'$, with another pinion, $d'$, mounted on the spindle $p$, so that said feed-wheel receives a continuous revolving motion in the same direction with said spindle. A spring, $h'$, which acts on the lever $a^1$, serves to depress the feed-wheel toward a serrated wheel, $l'$, which is mounted in the throat-plate. As the spindle $p$ revolves a constant rotary motion is imparted to the feed-wheel $h'$; and if the material to be cut is placed beneath the feed-wheel and held stationary, the cutting mechanism is fed automatically toward said material, the throat-plate J being placed beneath it, so that, by the co-operation of the cutting-edges of the revolving knife and of the throat-plate, the cutting is effected. The throat-plate may be constructed with one or more caster-rollers on its bottom surface, so that it will move easily on the table A, and it may be curved, as shown in Fig. 2, or it may be made in the shape of a flat plate, either oblong or in any desirable form. If desired, the feed mechanism may be dispensed with and the cutting mechanism may be directed entirely by the action of the workman, who can turn the same in any direction, or draw it out or push it in, as the formation of the pattern may require, so as to cause the knife to follow the contours of the pattern. In the front side of the feed-wheel is secured a sharpening-stone or sharpening device, $m$, which bears against the side of the disk-knife and serves to keep the cutting-edge of the knife sharp. As the sharpening device revolves with the feed-wheel it presents a constantly-varying surface to the knife. When the cutting-edge of the knife wears away the bracket $q$, which forms the bearings for the spindle $p$, may be lowered, and the cog-wheel K is extended to make up for the difference.

What I claim as new, and desire to secure by Letters Patent, is—

1. The combination of a rotating disk-knife with a throat-plate containing a knife-receiving socket and with a sliding and revolving shaft for imparting motion to said knife by suitable gear, substantially as shown and described.

2. The rod G which rises from the throat-plate and forms the bearings for a sleeve, F, and a cog-wheel, K, in combination with a rotating disk-knife and with a sliding and revolving shaft, substantially as set forth.

3. The sectional telescopic cog-wheel K, in combination with the throat-plate J, the rotating disk-knife L, and the sliding and revolving shaft C, substantially as described.

4. The combination of an automatic feed with a rotating disk-knife, a throat-plate, a sliding and rotating shaft, and operating-gear, substantially as set forth.

5. The sharpening device $m'$ mounted in the feed-wheel $h'$, in combination with the disk-knife L and with the mechanism for imparting motion to said parts, substantially as described.

ALBIN WARTH.

Witnesses:
W. HAUFF,
E. F. KASTENHUBER.